United States Patent [19]

Moriyama et al.

[11] 3,928,728

[45] Dec. 23, 1975

[54] NUMBER IDENTIFICATION CIRCUIT

[75] Inventors: Hiromi Moriyama, Fujisawa; Motosuke Kuwabara, Yokohama; Katsuyuki Jin, Kawasaki, all of Japan

[73] Assignee: Hitachi, Ltd., Japan

[22] Filed: Mar. 13, 1974

[21] Appl. No.: 450,775

[30] Foreign Application Priority Data

Mar. 26, 1973 Japan ................................ 48-33606

[52] U.S. Cl. .......................... 179/18 FH; 179/18 ET

[51] Int. Cl.$^2$ .......................................... H04Q 3/72

[58] Field of Search ...................... 179/18 ET, 18 FH

[56] References Cited

UNITED STATES PATENTS

| | | | |
|---|---|---|---|
| 2,946,043 | 7/1960 | Reenstra et al. | 179/18 ET X |
| 3,060,271 | 10/1962 | Lamin et al. | 179/18 FH |
| 3,562,742 | 2/1971 | Abe | 340/347 |
| 3,621,145 | 11/1971 | Verstegen | 179/18 ET |
| 3,772,651 | 11/1973 | Thyssens | 340/147 CN |

*Primary Examiner*—Thomas W. Brown
*Attorney, Agent, or Firm*—Craig & Antonelli

[57] ABSTRACT

In a translator of a telephone exchange having a number identification circuit in which number information lines and output lines to be identified are crossed in a matrix configuration, and a translation circuit for obtaining information of subscribers' terminal location, the information lines represents respective elements (0, 1, 2, 4, 7) of number information used on a two-out-of-five basis, and each output line is connected, in accordance with a selected number, through a pair of diodes to the information lines of one of number information line sets constituting respective digits, thereby providing a translator which is flexible in use as well as economical.

4 Claims, 1 Drawing Figure

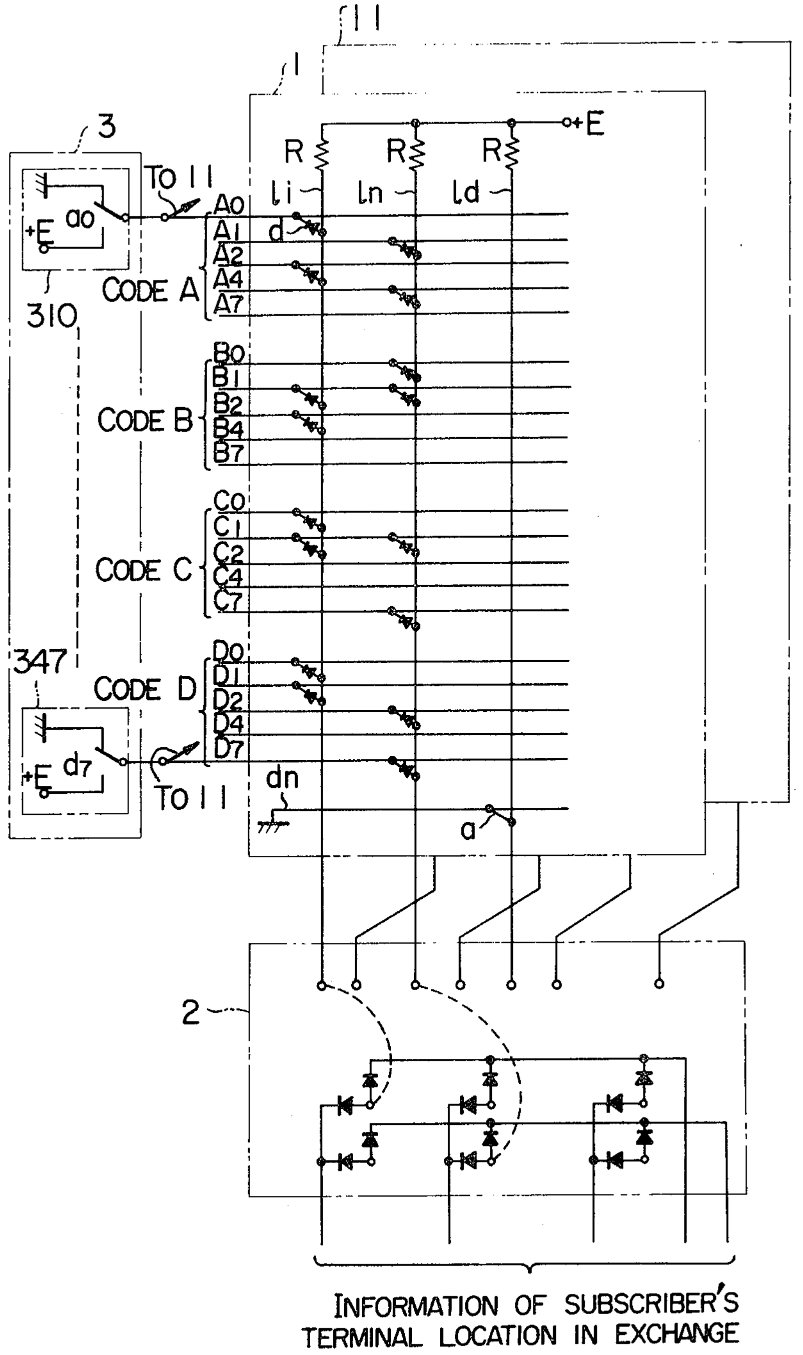
11
1
3
+E
To 11
A0
A1
A2
A4
A7
ao
d
Li
Ln
Ld
R
R
R
CODE A
310
B0
B1
B2
B4
B7
CODE B
C0
C1
C2
C4
C7
CODE C
347
D0
D1
D2
D4
D7
CODE D
d7
To 11
dn
a
2
INFORMATION OF SUBSCRIBER'S
TERMINAL LOCATION IN EXCHANGE

NUMBER IDENTIFICATION CIRCUIT

The present invention relates to an improvement in a number identification circuit used in the number translator of an automatic telephone exchange.

A number translator used conventionally in a crossbar exchange comprises a number identification circuit, a translation circuit and a jumper field between the circuits. The number identification circuit, when it receives information of a called telephone number, identifies an output corresponding to the number. The output of the identification circuit is applied through a jumper wire to the translation circuit, which is then actuated to obtain required information of the subscriber's terminal location in the exchange. Usually, a combination of tree circuits constituted of the contacts of relays is used as this kind of number identification circuit. With this type of number identification circuit, however, in the case where each piece of information corresponding to a single subscriber's number consists of four digits (or codes), it is necessary for the complete identification of all the four-digit numbers, to provide $10^4$ output lines in the identification circuit. Accordingly, the identification circuit will be of considerable size.

Moreover, the inherent merit of the number translator is the flexibility that the numbers assigned to subscribers can be arbitrarily chosen irrespective of the terminal locations on the crossbar switch. In order to fully enjoy the merit, it is necessary for the information of the called numbers to be entirely identified, and therefore the ratio of the cost of the number translator to that of the overall exchange which has fewer subscribers' terminals assumes rather a large value so that the exchange has the economical drawback of being expensive. In order to eliminate this drawback, the following artifices have been made: the entire identification of the called-number information is not usually performed, that is, code A, for example "O" for outgoing call or "1" for special trunk call, is excepted to identify, and the called-number information is partially limited according to the customers' requirements.

As described above, with the conventional number identification circuit, the flexibility and the economy run counter to each other and in actual application the former or the latter or both have to be sacrificed to a certain extent.

It is, therefore, a main object of the present invention to provide a number identification circuit which is flexible in use as well as economical.

Another object of the present invention is to provide a number identification circuit whose capacity is variable in accordance with the quantity of the number information to be identified.

An additional object of the present invention is to provide a number identification circuit in which the setting and the alteration of the number information to be identified can be easily performed.

A further object of the present invention is to provide a number identification circuit in which the number information to be identified can permit an addition and be increased without any elaborate work.

The primary feature of the present invention is the provision of number information lines for which input number information is supplied, output lines each of which is provided for a number to be identified, and a means for connecting the output lines with the corresponding number information lines according to the numbers. Thus, the paths for sending out the identified outputs are independently established for respective numbers so that the setting, alteration and addition of numbers to be identified can be easily performed by connecting the output lines with the number information lines.

According to another feature of the present invention, the number information lines and the output lines are arranged in a matrix configuration and the interconnection of the number information lines and the output lines is made at the cross points of both lines.

The above and other objects, features and advantages of the present invention will be apparent when one reads the following description of an embodiment of the present invention with the aid of the accompanying drawing which shows a number translator circuit using a number identification circuit according to the present invention.

In the FIGURE, a number identification circuit 1 comprises number information lines $A_o$, $A_1$, . . . applied with the number information from a number information supply circuit 3, and, output lines $\mathbf{1}_i$, $\mathbf{1}_n$ and $\mathbf{1}_d$ through which the identified outputs are fed to a translation circuit 2 for obtaining information of subscribers' terminal location in the exchange. The number identification circuit also includes diodes d to connect the number information lines with the output lines to be identified according to called numbers. The output lines are connected with a positive power source +E through resistors R. The number information lines $A_o$, $A_1$, . . . are connected respectively with number information supply means 310, . . ., 347 in the number information supply circuit 3. In this embodiment, the numbers are coded in biquinary (2–5, or 2 out of 5) notation, with four digits (codes) A, B, C and D. Only, the number information supply means 310 and 347 corresponding respectively to the "0"-element $A_o$ of the code A and the "7"-element $D_7$ of the code D are shown with the other supply means omitted, but it is of course that the means 311, 312, 314, 317, 320, 321, 322, 324, 327, 330, 331, 332, 334, 337, 340, 341, 342, and 345 (not shown) are connected respectively with the "0"- to "7"-elements $A_o$ to $A_7$ of the code A, the "0"- to "7"-elements $B_o$ to $B_7$ of the code B, the "0"- to "7"-elements $C_o$ to $C_7$ of the code C, and the "0"- to "7"-elements $D_1$ to $D_7$ of the code D. For example, the number supply means 310 has a change-over contact $A_o$ which is normally grounded and connected with a higher potential +E at the operation of number supplying.

As seen clearly in the FIGURE, the output line $\mathbf{1}_i$ is connected through diodes *d* with the lines $A_o$ and $A_2$ of the code A, the lines $B_1$ and $B_2$ of the code B, the lines $C_o$ and $C_2$ of the code C, and the lines $D_o$ and $D_1$ of the code D, and is regarded as one corresponding to the number "2311" in decimal notation. In like manner, the output line $\mathbf{1}_n$ is one corresponding to the decimal number "5189".

The output line $\mathbf{1}_d$ is not connected with any of the lines $A_o$ – $A_7$ and has no corresponding number. The line $\mathbf{1}_d$ is connected through a conductor wire a with a dummy number information line dn which is grounded at one end. Reference numeral 11 indicates another number identification circuit similar to the circuit 1.

The translation circuit 2 for obtaining subscribers' terminal location does not form the gist of this invention and a conventional translation circuit can be used as such in the circuit of the number translator shown in the FIGURE. Therefore, the detailed description of the circuit 2 is not provided. In the FIGURE, an example using diode meshes is shown in which the output of each of the output lines to be identified $1_i$ and $1_n$ is fed through a jumper line represented by broken line to the junction point of two diodes to be converted to the information of a subscriber's terminal location consisting of two pieces of information.

As apparent from the structure shown in the FIGURE, the output lines $1_i$ and $1_n$ are normally kept at the ground potential since the diodes d are conductive, but when the potential +E is applied, for example, to the lines $A_o$, $A_2$, $B_1$, $B_2$, $C_o$, $C_1$, $D_o$ and $D_1$ due to the actuation of the number information supply circuit 3, all the diodes d connected with the line $1_i$ are cut off to maintain the line $1_i$ at the potential +E while the other lines $1_n$ and $1_d$ remain at the ground potential. The signal of this potential is converted through the translation circuit 2 into the corresponding information of a terminal location. The unused output line is always grounded through the conducter wire a (or a diode) and does not adversely affect the number identification operation.

Since a number on each output line to be identified can be determined by providing two diodes for each of codes A to D, then if pins incorporating diodes therein and a pin board forming a diode matrix are used the selection of numbers can be performed by merely inserting the pins into the pin board in place of jumper wiring which is conventionally employed. Consequently, the operation of number setting and alteration is very much facilitated and the numbers to be called can be arbitrarily selected by appropriately inserting the pins into the pin board. Moreover, the number of the digits of any telephone number can be arbitrarily selected by selecting the number of the diodes provided for each output line to be identified.

Further, the number translator using a diode-matrix identification circuit according to the present invention is provided for a group of subscribers and if it is required to increase the number of subscribers' terminals, the capacity of the diode matrix must be increased according to the number of the additional subscribers' terminals. In general, the increase in the subscribers' terminals is accompanied by the increase in the number of switching frames and if the diode matrices are provided respectively for the switching frames, as shown at numeral 11 in the FIGURE, and if the output of the diode matrix for each switching frame is fed to the translation circuit 2 after the output has been discriminated according to the switching frame information, then only one translation circuit suffices for the common use.

Since it is possible to increase the number translators in proportion to the increase in the subscribers' terminals, the cost of the number translators nearly depends directly upon the number of the subscribers' terminals; in other words, the cost of the number translator per each subscribers' terminal is about the same even in smaller number of the subscribers' terminals, whereas that of the number translators of the conventional system does not depend upon the number of the subscribers' terminals, and the cost of the number translator per each subscribers' terminal is very high in smaller number of the subscribers' terminals. Further, the present system also has a functional advantage that the subscribers' numbers can be arbitrarily set.

Moreover, in case where number translators are provided respectively for switching frames, the inputs or outputs can be connected in logical "OR" configuration so that the incorporation of additional subscribers' terminals can be finished only through the use of connectors or the insertion of circuit packs if the circuit packs are used. Thus, the device has a great facility in increasing the number of subscribers' terminals.

What we claim is:

1. A number identification circuit with a two-out-of-five diode matrix, comprising:

a plurality of number information line sets corresponding to respective digits of a subscriber's number, each number information line set including five number information lines representative of respective elements of number information used on a two-out-of-five basis;

a pluraliity of output lines to be identified corresponding to respective numbers, said number information lines and said output lines being arranged in a matrix configuration;

number setting means including a plurality of diode pairs each of which connects a selected one of said output lines to two selected number information lines of one of said number information line sets in accordance with number information elements for one digit of the number corresponding to the selected output line;

controlling means including first DC power source means for applying during nonidentification time periods a first potential to all of said number information lines which causes the diodes of said number setting means to be conductive and for applying only during an identification operation time period only to said two selected number information lines a second potential which causes the diodes of said number setting means associated therewith to be nonconductive while applying the first potential to nonselected number information lines; and second DC power source means, whereby outputs are applied from said second DC power source means only to the output lines to which the diodes connected to said two selected number information lines are connected as an identification of the respective digits.

2. A number identification circuit as claimed in claim 1, further comprising:

at least one output line to be identified to which no number is allotted;

at least one dummy number information line; and means connecting said at least one output line to said dummy number information line.

3. A number identification circuit as claimed in claim 1, wherein said output lines are coupled through jumper wires respectively to a translation circuit for obtaining information of subscribers' terminal location, and a plurality of frames, each frame including said information line sets, said output lines and said controlling means, the number information lines of said frames being connected to said first DC power source means.

4. A number identification circuit as claimed in claim 2, wherein said output lines are coupled through jumper wires respectively to a translation circuit for obtaining information of subscribers' terminal location, and a plurality of frames, each frame including information line sets, said output lines and said controlling means, the number information lines of said frames being connected to said first DC power source.

* * * * *